US007760664B2

(12) United States Patent
Gupta

(10) Patent No.: US 7,760,664 B2
(45) Date of Patent: *Jul. 20, 2010

(54) DETERMINING AND PROVISIONING PATHS IN A NETWORK

(76) Inventor: Sanyogita Gupta, 8 Colasurdo Ct., Edison, NJ (US) 08820-4420

( * ) Notice: Subject to any disclaimer, the term of this patent is extended or adjusted under 35 U.S.C. 154(b) by 1005 days.

This patent is subject to a terminal disclaimer.

(21) Appl. No.: 11/101,136

(22) Filed: Apr. 7, 2005

(65) Prior Publication Data

US 2006/0067236 A1    Mar. 30, 2006

Related U.S. Application Data

(60) Provisional application No. 60/614,609, filed on Sep. 30, 2004.

(51) Int. Cl.
*H04L 12/28* (2006.01)
*G06F 15/177* (2006.01)
*G06F 15/16* (2006.01)

(52) U.S. Cl. ............ 370/254; 370/389; 370/400; 709/220; 709/249

(58) Field of Classification Search ......... 370/235–240, 370/254–258, 400–401; 709/220, 249
See application file for complete search history.

(56) References Cited

U.S. PATENT DOCUMENTS

| | | | |
|---|---|---|---|
| 4,284,852 A | 8/1981 | Szybicki et al. | 379/221.01 |
| 4,669,113 A | 5/1987 | Ash et al. | 379/221.01 |
| 4,788,421 A | 11/1988 | Ogawa et al. | 250/201.5 |
| 5,297,137 A | 3/1994 | Ofek et al. | 370/403 |
| 5,377,262 A | 12/1994 | Bales et al. | 379/221.06 |
| 5,526,414 A | 6/1996 | Bedard et al. | 379/221.01 |
| 5,764,740 A * | 6/1998 | Holender | 379/112.05 |
| 6,091,720 A | 7/2000 | Bedard et al. | |
| 6,981,065 B1* | 12/2005 | Lu | 709/251 |
| 7,173,912 B2* | 2/2007 | Jaber et al. | 370/254 |
| 2002/0029298 A1* | 3/2002 | Wilson | 709/316 |
| 2003/0071840 A1 | 4/2003 | Huang et al. | |
| 2003/0189919 A1 | 10/2003 | Gupta et al. | |
| 2004/0107277 A1 | 6/2004 | Levesque et al. | |
| 2005/0097108 A1* | 5/2005 | Wang et al. | 707/100 |
| 2005/0169179 A1* | 8/2005 | Antal et al. | 370/231 |
| 2006/0015617 A1* | 1/2006 | Castro et al. | 709/226 |

OTHER PUBLICATIONS

International Search Report for PCT/US2005/034418 mailed Dec. 27, 2006.
European Search Report for European Application 05857725.5, dated Aug. 25, 2009.
Notice of Rejection for Japanese Patent Application No. 2007-534687, mailed Jul. 31, 2009 (with English Translation).

* cited by examiner

*Primary Examiner*—Tri H Phan

(57) ABSTRACT

A network provisioning system for establishing a path between two networks is disclosed wherein a common network device between those networks is modeled as a link between a first network element in one network and a second network element in a second network. A network routing graph is created by an inventory subsystem in a routing manager by inventorying the physical network elements and links in the network. The inventory subsystem then models those elements/links as a plurality of nodes and links between the nodes. At least one common network device, such as a digital cross connect connecting the two networks, is modeled as a link instead of a node. A routing engine then uses the network routing graph, including the link modeled from the common network device, to provision a path between the networks.

14 Claims, 5 Drawing Sheets

DETERMINING AND PROVISIONING PATHS IN A NETWORK

This application claims the benefit of U.S. Provisional Application No. 60/614,609, filed Sep. 30, 2004, which is hereby incorporated herein by reference.

BACKGROUND OF THE INVENTION

Communications networks, such as next generation broadband networks, have become increasingly complex due to increased size, numerous intermixed technologies/protocols (e.g., ATM, Frame Relay, etc.), and the intermixing of equipment manufactured by numerous different vendors. As a result, network configuration management systems that can provision virtual trunks and circuits within these networks are becoming increasingly important. Such network configuration management systems function to determine the paths/routes between network equipment, herein referred to as network elements, and to communicate with those network elements to realize desired trunks or circuits that facilitate the transmission of traffic across the network.

In general, network configuration management systems have traditionally determined the paths available by modeling portions of network elements as nodes on a graph and the links/interconnections between these portions as links between the nodes. More particularly, prior systems typically modeled every port of every network element as a node on the graph and modeled every physical link that interconnected these ports to one another as links that interconnected the nodes of the graph. The network model was then used to provision virtual trunks, which formed paths between network elements in the network. Once these virtual trunks were provisioned, virtual circuits could then be established across these trunks to support traffic flow from one point to another in the network.

FIG. 1 shows an exemplary prior art network configuration management system 102 and a network 110 managed by system 102. The network configuration management system 102 functions to determine a preferred path between two points in a network (i.e., between two network elements) and for provisioning a communications connection across this path by communicating with the managed network 110. Managed network 110 consists primarily of broadband network 112 which, in turn, consists of a plurality of network elements 114-118 interconnected by physical links and virtual trunks and circuits represented in FIG. 1 by links 120-124. The network elements comprise varying technologies and protocols and may be manufactured by different vendors. Managed network 110 further comprises network management systems, such as network management system (NMS) 126, and element management systems, such as element management system (EMS) 128. These systems are typically provided by the network element manufacturers and typically function to perform the actual configuration and management of the individual network elements.

NMSs and EMSs may function to control both the network elements and the links between those elements. However some may not control the links between the elements and, instead, only manage the network elements themselves. For example, an NMS, such as NMS 126, may function to collectively manage a set of network elements 114 and the physical links 120 between them, thus forming a collectively managed sub-network having network elements 114. Accordingly, when network traffic arrives at an ingress port into one of the network elements 114, such as port 130, the NMS 126 determines a set of links and network element cross-connects to interconnect port 130 to an egress port, such as port 132. The NMS 126 then provisions the network elements to realize this interconnection. In another example, some management systems, such as EMS 128, may only manage one or more network elements 118, but not the links 124 between them. Here, a higher layer entity, such as the Network Configuration Management System 102, determines the links between network elements 118 required to create a path and then instructs the EMS to perform the necessary cross-connects within network elements 118 to realize the complete path.

FIG. 1 also shows how some network elements, such as network elements 116, are not managed by either an NMS or EMS. Specifically, a higher layer entity, once again such as Network Configuration Management System 102, directly communicates with these elements to perform network configuration functions. In this case, Network Configuration Management System 102 would configure any cross-connects within network elements 116 as well as any links between network elements. Thus, as shown in FIG. 1, to facilitate traffic flow across broadband network 112, for example from port 130 on network element 114 to network element 118, the combination of Network Configuration Management System 102, NMS 126 and EMS 128 will collectively determine an appropriate network path across and between network elements 114, 116 and then provision virtual trunks and circuits across network 112.

One difficulty with prior methods of using network configuration management systems, such as those described above, is that the modeling of the network elements, physical links, and virtual trunks and circuits results in very large, inefficient models that do not adapt well to diverse network elements and large networks. Specifically, such large models result in correspondingly large and complex network model graphs which, in turn, create performance and scalability issues due to the demanding processing requirements associated with such graphs. Therefore, in one prior attempt at solving this problem and to reduce the aforementioned disadvantages, a network model was created based on how the ingress and egress ports of each network element can be interconnected within themselves and to other network elements. Specifically, in this prior attempt, a simplified routing graph was created by the network configuration management system whereby, instead of modeling each port of a network element as a node on a routing graph, an entire network element itself could be represented as one or more routing nodes or, in some cases, multiple network elements could be represented as a single routing node. Referring to FIG. 2, for example, network elements 114 of FIG. 1 that are managed by NMS 126 are modeled as a single node 201. Additionally, network elements 118, which are managed by both EMS 128 and the Network Configuration Management System 102 are also modeled as a single routing node 204. Network elements 116 are each modeled as individual routing nodes, since the Network Configuration Management System 102 manages both the network element and the link between the elements. In such a model, therefore, the individual physical hardware links are not each modeled but, rather, one or more network elements are modeled as a single routing node based on how those network elements and the links between them are managed. Such an attempt is generally described in pending U.S. patent application Ser. No. 10/118,187, filed Apr. 8, 2002 and entitled "Determining and Provisioning Paths Within a Network of Communication Elements" (hereinafter referred to as the "'187 application"), which is hereby incorporated by reference herein in its entirety.

SUMMARY OF THE INVENTION

While the prior methods of creating network models for routing traffic across networks and between multiple networks are advantageous in many regards, as discussed above they are limited in certain regards. In particular, while processing associated with network routing can be greatly simplified using the prior methods, such processing can still be resource and overhead intensive. This is especially the case as networks using different speeds and/or protocols are being interconnected to provide new and more complex services to customers.

Accordingly, the present inventor has invented a network provisioning system for establishing a path between two networks wherein a common network device between those networks is modeled as a link between a first network element in one network and a second network element in a second network. In one embodiment, a network routing graph is created by an inventory subsystem in a routing manager by inventorying the physical network elements and links in the network. The inventory subsystem then models those elements/links as a plurality of virtual nodes and links between the nodes. At least one common network device, such as a digital cross connect located at a junction between the two networks, is modeled as a link instead of a node. A routing engine then uses the network routing graph, including the link modeled from the common network device, to provision a path between the two networks. Thus, since fewer nodes are represented in a network graph of the modeled network, route processing is reduced, resulting in a corresponding reduction in overhead and resources required to route network traffic from one node to another.

DETAILED DESCRIPTION OF THE INVENTION

Figure 1:
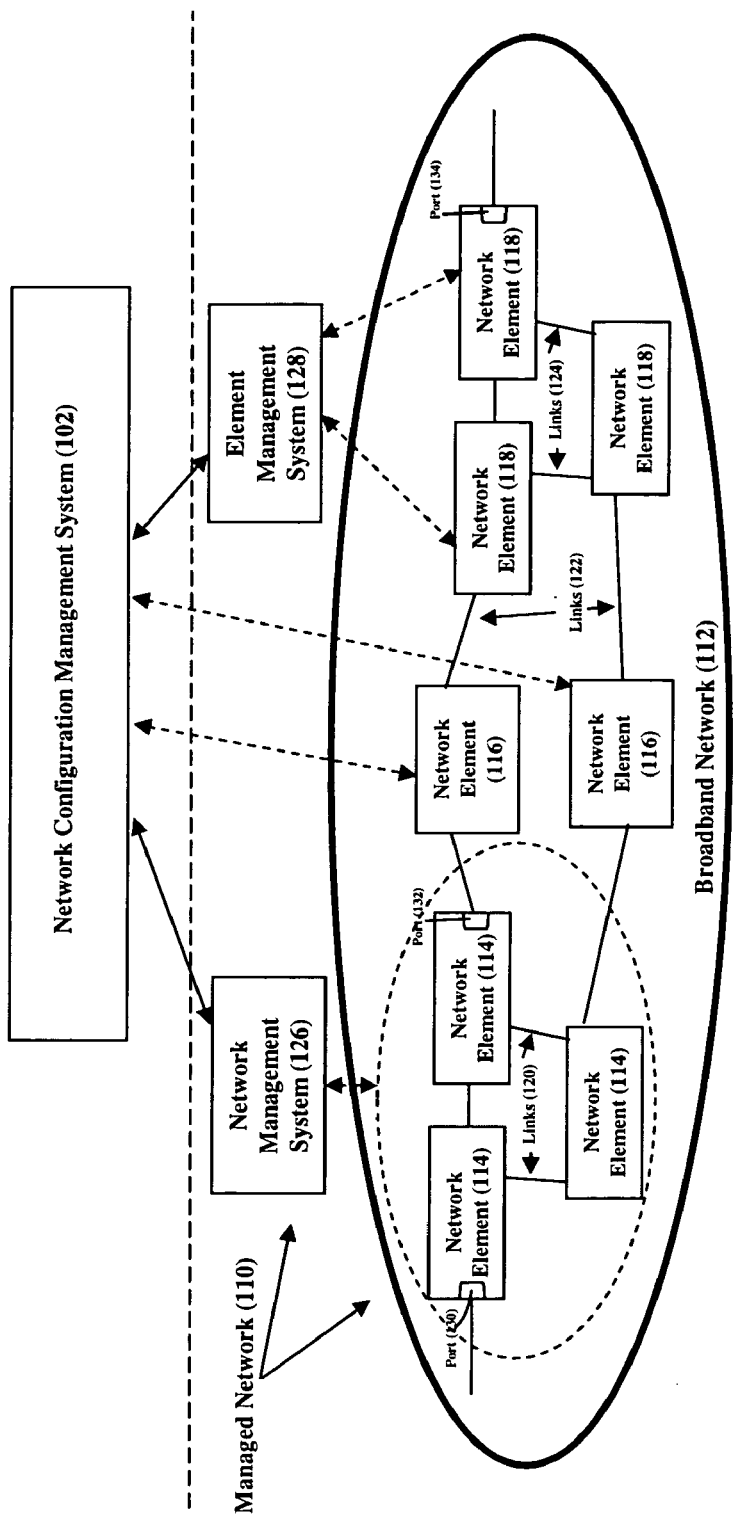
FIG. 1 shows a prior art managed broadband network and a network configuration management system for determining and provisioning routing paths within the network.
Figure 2:
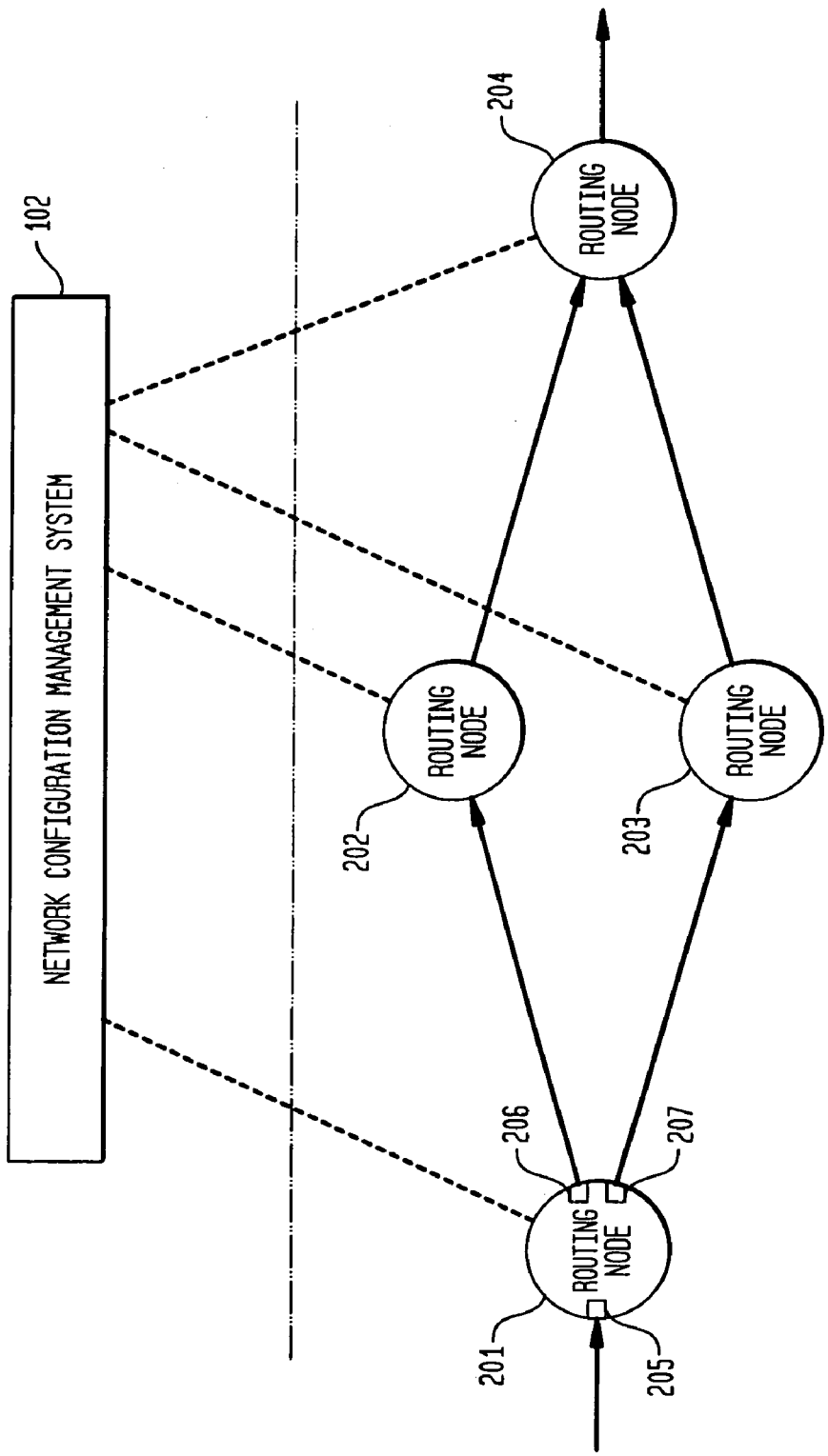
FIG. 2 shows a network routing model whereby some network elements are combined and treated as single routing nodes.
Figure 3:
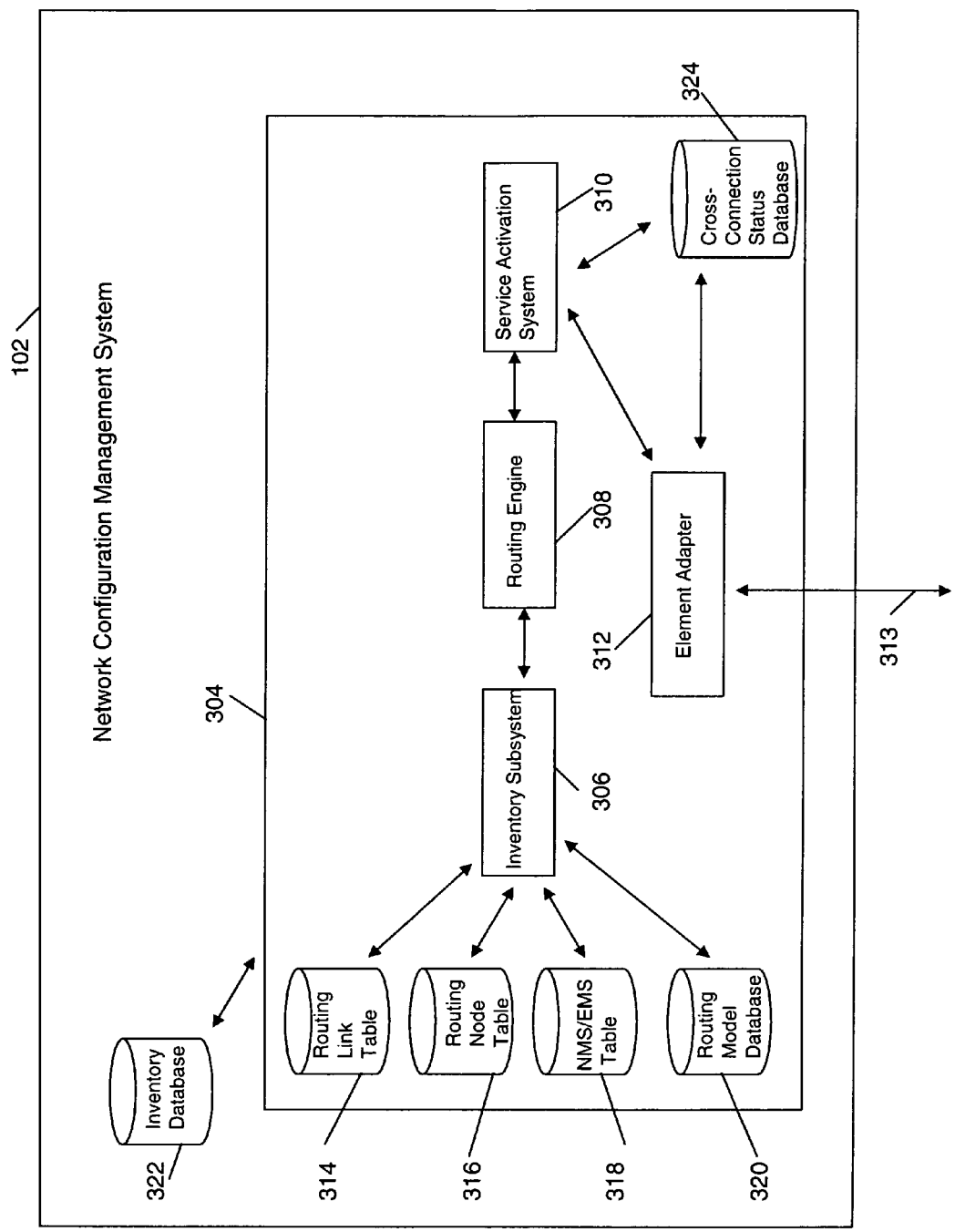
FIG. 3 shows an illustrative network configuration management system.

FIG. 3 shows an illustrative network configuration management system, such as Network Configuration Management System (NCMS) 102 in FIGS. 1 and 2. As discussed above, NCMS 102 determines preferred routing paths between two ports within the network by modeling the network paths as a plurality of routing nodes and links between the nodes, and for using these paths to provision virtual trunks and circuits within the networks. To accomplish this function, NCMS 102 includes, among other components, a routing manager 304 and inventory database 322. The routing manager 304 provides end-to-end connection management functions including the determination and provisioning of routing paths in broadband network 112 in FIG. 1. In order to accomplish these functions, routing manager 304 comprises an inventory subsystem 306, a routing engine 308 and a service activation system 310. The routing manager 304 is connected to the various network elements via an element adapter 312 and connection 313. Broadly, the routing manager 304 maintains a topological graph comprising nodes and links that model the broadband network 112. This graph is used to determine and provision routing paths between, for example, two ports within the network. These paths are then used to provision virtual trunks and circuits.

The inventory subsystem 306 builds and maintains the topological graph in accordance with modeling methods such as those described above in association with the '187 application. This graph is maintained, illustratively, in three database tables: routing link table 314, routing node table 316, and NMS/EMS table 318. The routing engine 308 determines a routing path for traffic through the network using the network graph maintained by the inventory subsystem 306. The service activation system 310 then uses the determined routing path to provision the actual virtual trunk or virtual circuit. Specifically, the service activation system 310 activates the routing engine 308 to obtain a routing path given two endpoints and then invokes the element adapter 312 which interfaces with network elements, NMSs and EMSs to physically provision the determined path. As such, the element adapter 312 functions as an interface between the routing manager 304 and the NMSs 126, EMSs 128, and network elements 116 in managed broadband network 112. As one skilled in the art will recognize, there is typically a specific element adapter designed for use with NMSs, EMSs, and network elements manufactured by different manufacturers. As such, a network management system may have multiple element adapters, or different modules in one element adapter. Accordingly, once the service activation system determines a routing path, it invokes the appropriate adapter(s) or adapter module(s) to communicate the required configuration settings to the management systems/elements 126, 128, and 116 to provision the determined path.

As one skilled in the art will recognize, and as is further discussed herein below, network traffic may be required to traverse multiple separate networks. These different networks may be interconnected with cross connects, such as digital cross connects (DCSs). As such, it is necessary for the NCMS 102 to also have available configuration and status information related to these DCSs. This configuration and status information is, illustratively, maintained in cross-connection status database 324. Thus, in provisioning the aforementioned path, service activation system 310 may also refer to cross-connection status database 324.

The prior illustrative method described in the '187 application for using an NMS to simplify routing graphs is advantageous in many regards. By eliminating the need to inventory individual ports and by reducing the number of nodes necessary to consider in routing network traffic from one point to another, the processing overhead and timeliness associated with making routing decisions is greatly reduced. Additionally, such an approach adds considerable flexibility in designing and maintaining routing graphs. Specifically, as described in that application, instead of inventorying and maintaining a database of each port in a network and the interconnections between those ports, it is only necessary to inventory the routing nodes and the links between the routing nodes that, for example, may consist of several network elements.

As one skilled in the art will recognize, the method described in the '187 application is primarily focused on network routing at layer 2 of the network. As is well understood, networks have been modeled as operating at different layers. One model for such network layers is known as the Open System Interconnection (OSI) model, which generally defines 7 different layers in the network. Layer 2 is also known as the data link layer and is the layer at which the physical medium is shared and where data link and media access are controlled. For example, in Ethernet networks, layer 2 is the layer at which network routing between media access control (MAC) addresses of individual hardware components is performed.

The above-described network model at layer 2 of a network is primarily useful within a single network. However, with increasingly complex and large networks it has become necessary to cross network boundaries in order to route network traffic from one destination to another. In many cases, the different networks rely on different protocols, operate at different speeds and may even operate using a different physical medium (e.g., copper vs. optical fiber). In order to interconnect such networks, DCSs or other similar devices, such as optical cross connect systems (OCSs), are used. As used herein, a DCS is any device that interconnects networks to facilitate traffic routing from one network to another or to link portions of networks using one protocol or traffic rate to another portion using a different protocol or rate. Such DCSs are very well known in the art and serve to efficiently manage disparate traffic protocols and line speeds in telecommunications system central offices as well as remote field locations and other locations such as within hotels and even at user premises. Such DCSs may be used in a variety of different applications. For example, DCSs may be used at a customer premises to interface with both voice protocol networks and a number of different data protocol networks in order to aggregate and cross connect these networks to a high-speed copper wire or optical fiber loop. Additionally, DCSs may be used in a digital loop carrier (DLC) capacity to aggregate networks using multiple protocols for transmission across a SONET ring network. In another common implementation, such DCSs may be used within, illustratively, a telecommunications central office in order to manage and cross connect channels from multiple SONET rings that are employed in an access network and/or a metro or inter-office network. Other uses of DCS are well known and will be obvious to one skilled in the art.

Figure 4:
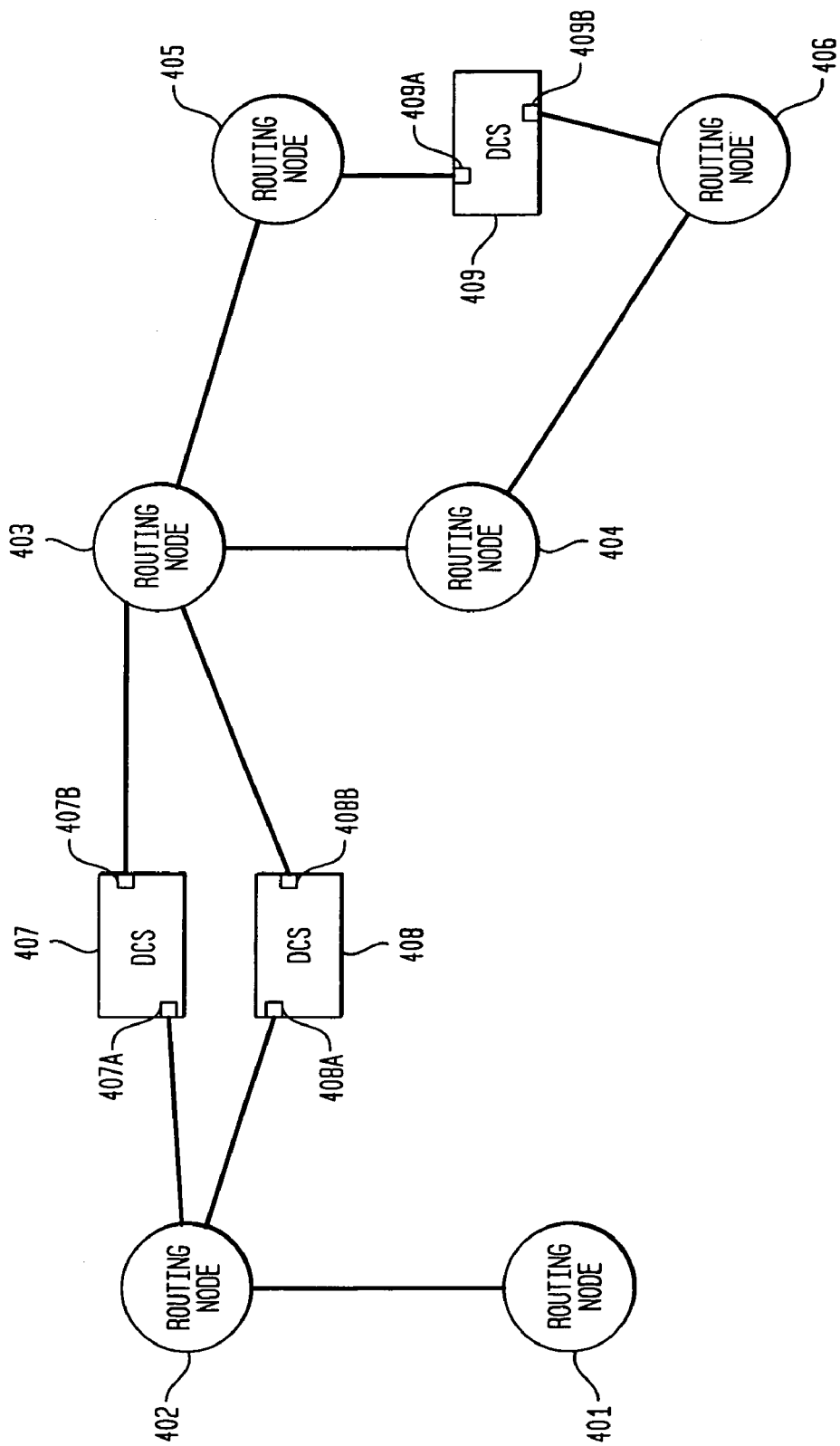
FIG. 4 shows a network routing model whereby Digital Cross Connect Systems (DCSs) are used to interconnect different network nodes.

FIG. 4 shows one illustrative routing map wherein DCSs are used to connect networks to facilitate traffic flow from one network to another. In particular, FIG. 4 shows routing nodes 401-406, each of which represents, illustratively, a network, such as broadband network 112, or a portion of a network, such as the group of network elements 116 also in FIG. 1. As such, each of the routing nodes 401-406 illustratively has a plurality of network elements that are modeled, for routing purposes, as a single routing node with an ingress port and an egress port, such as ports 130 and 134, respectively, in FIG. 1. The networks represented by each of routing nodes 401-406 may, for example, operate using a different protocol or speed and, therefore, DCSs, such as DCSs 407, 408 and 409, may be used to aggregate and/or disaggregate traffic in order to facilitate the transmission of that traffic between and over the different networks interconnected by the DCSs. For example, routing nodes 402 and 405 may represent well-known OC-3 networks operating at an illustrative speed of 155.52 Mb/s while the networks represented by nodes 403 and 406 may be well-known OC-12 networks operating at an illustrative 622.08 Mb/s rate. DCSs 407 and 408 aggregate and/or disaggregate the data between the networks represented by nodes 402 and 403 and DCS 409 aggregates and disaggregates the traffic between the networks represented by nodes 405 and 406. Typically, paths through DCSs 407-409 are provisioned in a relatively static manner. For example, a path from port 407A, associated with node 402, to port 407B, associated with node 403, is provisioned on DCS 407 in order to provide connectivity between the networks represented by nodes 402 and 403. Connections between ports 408A/408B and 409A/409B are similarly provisioned to connect nodes 402/403 and 405/406, respectively. Thus, one skilled in the art will recognize that DCSs 407-409 function as common nodes between the respective networks.

As one skilled in the art will recognize, a DCS, such as any one of DCSs 407-409, functions similarly in some respects to a network switch, such as a router or ATM switch. However, such routers/switches typically operate as a function at least in part of the signaling accompanying traffic transiting the network and, hence, such routers/switches are typically closely tied to specific services provided by a network service provider. A DCS is typically not used for such purposes. Instead, a DCS is typically used for transmission management at a higher level of the network. Specifically, unlike most telecom services where switch control is an inherent element of the service provided to customers and is closely tied to the protocol used at layer 2 of the network, DCSs are typically used as an engineering and provisioning control mechanism at layer 1 in the network (i.e., the physical layer of the network). As such, DCSs are typically not used to dynamically alter switching over a short time period, as are routers and other types of switches. Additionally, DCSs are not typically controlled as a function of signaling from a customer but are, instead, controlled directly by, for example, engineers at the service provider. Also unlike simpler network switches, a typical DCS facilitates the provisioning of network paths and connections across the DCS that are typically constant over a period of hours to months.

As service providers, such as telecommunication service providers, strive to provide more advanced features to consumers, interconnections and junctions between networks, such as those created by DCSs 407-409 and other similar devices, become greater in number and grow in importance. These interconnection devices must be taken into account when developing a network routing strategy. Traditionally, in making routing decisions, the network configuration management system modeled devices such as DCSs as one or more separate routing nodes. The present inventor have discovered, however, that such a modeling of DCSs increases the routing processing required due to a larger number of "hops" necessary to traverse nodes in the routing model. This increases both the time and overhead necessary to, for example, generate the aforementioned routing graphs. Therefore, the present inventor have further discovered that, in addition to simplifying routing decisions at layer 2 of a network, as described in the '187 application, it is desirable to also simplify the routing graph at layer 1 of the network. Specifically, instead of treating DCSs as a separate node (or multiple nodes corresponding the ports on the DCS) in the network, it is also desirable to model DCSs differently in order to further simplify the routing graphs/decisions. More particularly, in part since DCSs and other similar devices are relatively static in configuration, the present inventor have discovered that such devices may be treated as links, such as would be formed by a physical cable, instead of nodes that require processing as an affirmative routing hop.

Figure 5:
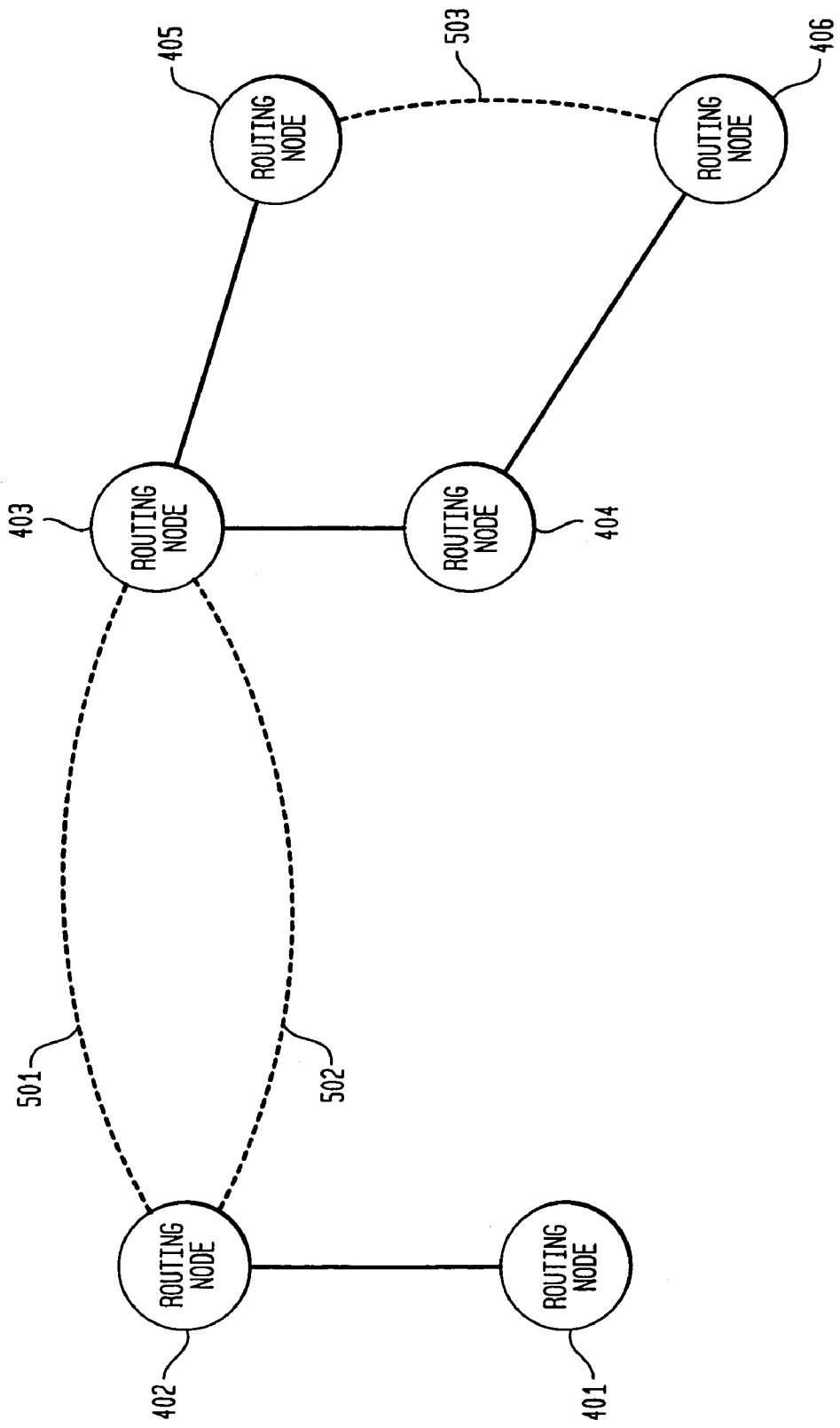
FIG. 5 shows a network routing model in accordance with the principles of the present invention whereby DCSs are modeled as links.

As described above in association with the '187 application, prior to provisioning network paths in a network, such as network 112 in FIG. 1, a network configuration management system, such as NCMS 126 in FIG. 1 will inventory the network elements and links in the network. Once these elements and links are defined, the NCMS generates a routing graph showing the network topology in terms of routing nodes and links to be used in provisioning trunks/circuits across the network. FIG. 5 is a simplified representation of such a routing map. In particular, routing nodes 401-406 are as described above in association with FIG. 4. Each of those routing nodes consists, for example, of a plurality of network elements that are modeled at a high level as a single routing node in order to decrease the processing overhead required to provision the aforementioned trunks/circuits. However, instead of modeling the ports of DCSs 407-409 of FIG. 4 as individual nodes, or as multiple nodes, those illustrative DCSs are modeled as links 501, 502 and 503. Links 501, 502 and 503 are used in the routing graph of FIG. 5 to represent DCSs 407, 408 and 409, respectively. Accordingly, in accordance with the principles of the present invention, a cross-connect, such as a DCS, is not modeled as one or more routing nodes having various links connecting ports to each other and to external ports on other network elements. Instead, such a cross-connect is modeled as a separate link between network elements in one or more networks. Accordingly, the routing map is greatly simplified.

One skilled in the art will recognize that, as DCSs or other network components are added or deleted, the NCMS will inventory the network elements and links between the elements, treating DCSs as links as described above. Specifically, this inventory is conducted by the inventory subsystem 306 of FIG. 3. As a part of this inventory, routing link table 314, routing node table 316, NMS/EMS table 318 and cross connection status database 324 are updated with information about the links, nodes and cross connections in and between the networks managed by the NCMS 102. Therefore, in this inventory, information concerning each DCS will be updated in the cross-connection status database and those same DCSs will be updated as links in the routing link table. As a result, when service activation system 310 invokes the routing engine 308 to provision a path, that engine will treat the DCSs as links to be provisioned and not one or more network nodes corresponding to the ports on the DCS. When network traffic traverses a particular DCS, configuration and status information related to that DCS is retrieved from cross connection status database 324 to identify how the path across the DCS should be provisioned to route the traffic to the appropriate destination.

One skilled in the art will recognize that many variations are possible and that any or all of these embodiments described herein above may be combined in order to create a border element function that is decentralized depending upon the needs of a particular network in order to add flexibility to network design and to reduce routing management overhead costs. The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A network provisioning system for establishing a path between at least a first network element and at least a second network element, said at least a first network element and said at least a second network element being interconnected through a digital cross connect system, said system comprising:
    a routing manager computer comprising an inventory subsystem and a routing engine,
        wherein the inventory subsystem is configured to model each of said at least a first network element and said at least a second network element as one or more routing nodes in a graph, said graph comprising a plurality of routing nodes and a plurality of links interconnecting said plurality of routing nodes; and
        wherein the routing engine is configured to use said graph for determining a path between said at least a first network element and said at least a second network element,
        wherein the inventory subsystem models said digital cross connect system as a link between said at least a first network element and said at least a second network element; and
    a cross connection status database configured to store a status of each interconnection of said plurality of routing nodes, wherein the status indicates whether a cross-connection using said digital cross connect was successfully provisioned.

2. The network provisioning system of claim 1 wherein said at least a first network element is in a first network and said at least a second network element is in a second network.

3. The network of claim 1, wherein the digital cross connect system comprises a first port associated with the first network element and a second port associated with the second network element.

4. A routing manager for provisioning paths for network traffic between a plurality of network elements in one or more networks wherein at least a first digital cross connect system is disposed between a first network element in said plurality of network elements and a second network element in said plurality of network elements, said routing manager comprising:
    means for creating a graph of routing nodes and links, said routing nodes representing one or more network elements in said plurality of network elements and said links representing interconnections between said routing nodes;
    means for modeling said at least a first digital cross connect system as a link between those routing nodes representing said first network element and said second network element; and
    means for storing a status of each of said interconnections, wherein the status indicates whether a cross-connection using said digital cross connect system was successfully provisioned.

5. The routing manager of claim 4 wherein said first network element is an element in a first network and said second network element is an element in a second network.

6. The routing manager of claim 4, wherein the digital cross connect system comprises a first port associated with the first network element and a second port associated with the second network element.

7. A method for routing network traffic between a first network and a second network, each of said first and second networks comprising a plurality of network elements, said plurality of network elements connected by a digital cross connect, said method comprising the steps of:
    determining, with a network configuration management system, the interconnections created by said digital cross connect between at least two network elements in said plurality of network elements; and representing each of said interconnections as a link between said at least two network elements; and storing a status of each of said interconnections in a cross connection status database, wherein the status indicates whether a cross-connection using said digital cross connect was successfully provisioned.

8. The method of claim 7 further comprising provisioning a path between said at least two network elements.

9. A method for determining a path between a first network element in first network and a second network element in a second network, said first network connected to said second network via a digital cross connect system, each of said networks comprising a plurality of network elements and a plurality of network links, said method comprising the steps of:

modeling, via a network configuration management system, said plurality of network elements in said first and second networks as one or more routing nodes;

modeling said network links as routing links, said routing links interconnecting said routing nodes;

modeling said digital cross connect system as a routing link connecting a first routing node in said first network to a second routing node in said second network; and storing a status of each interconnection of said routing nodes, wherein the status indicates whether a cross-connection using said digital cross connect system was successfully provisioned.

10. The method of claim 9 further comprising:
storing said routing links in a routing link table.

11. The method of claim 9 further comprising the step of:
determining a network path between said first routing node and said second routing node using said routing link.

12. The method of claim 11 further comprising the step of:
provisioning said network path to interconnect a first network element in said first routing node with a second network element in said second routing node.

13. The method of claim 9, wherein the digital cross connect system comprises a first port associated with the first network element and a second port associated with the second network element.

14. A method for determining a path between a first network element in a first network and a second network element in a second network, said first network connected to said second network via a common network device, each of said networks comprising a plurality of network elements and a plurality of network links, said method comprising the steps of:

modeling, via a network configuration management system, said plurality of network elements in said first and second networks as one or more routing nodes;

modeling said network links as routing links, said routing links interconnecting said routing nodes;

modeling said common network device as a routing link connecting a first routing node in said first network to a second routing node in said second network; and maintaining a status of said routing links, said status indicating whether a cross-connection using at least one of said routing links was successfully provisioned.

* * * * *